3,324,117
CARBOXYLIC ACID PIPERAZIDES AND PROCESS
FOR THEIR MANUFACTURE
Manfred Schorr, Frankfurt am Main, Georg Lämmler,
Giessen, and Wilhelm Hohorst and Helmut Weber,
Frankfurt am Main, Germany, assignors to Farbwerke
Hoechst Aktiengesellschaft vormals Meister Lucius &
Brüning, Frankfurt am Main, Germany, a corporation
of Germany
No Drawing. Filed Oct. 26, 1965, Ser. No. 505,234
Claims priority, application Germany, Dec. 21, 1962,
F 38,627
9 Claims. (Cl. 260—240)

This application is a continuation-in-part of U.S. application Ser. No. 296,479, filed July 22, 1963, now abandoned.

The present invention relates to carboxylic acid piperazides of the general formulas

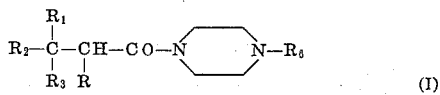

and

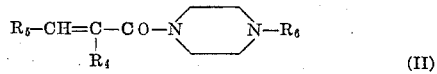

and salts thereof with physiologically tolerable acids, in which R is hydrogen, halophenyl or halobenzyl, $R_1$ and $R_3$ are hydrogen, lower alkyl, phenyl, or halophenyl, $R_2$ is phenyl or halophenyl, $R_4$ and $R_5$ are halophenyl, wherein R, $R_1$, $R_2$, and $R_3$ include a total of at least (a) two halophenyl, (b) one halophenyl and one halobenzyl, (c) three phenyl, or (d) two phenyl and one halophenyl and $R_6$ is hydrogen, lower alkyl, hydroxy-lower alkyl, lower alkoxy-lower alkyl, cyclohexyl, lower alkyl-cyclohexyl, phenyl-lower alkyl or halophenyl-lower alkyl which are valuable medicaments having strong anthelmintic properties.

The present invention likewise comprises preparations containing carboxylic acid piperazides of the general Formulas I or II or their salts together with a pharmaceutically acceptable auxiliary and carrier substance.

The compounds of the present invention are prepared from carboxylic acids of the general formulas

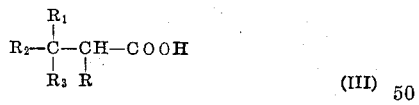

or

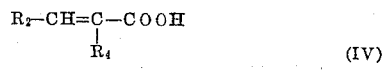

wherein R, $R_1$, $R_2$, $R_3$, $R_4$ and $R_5$ have the meanings given above or a reactive derivative thereof with a piperazine of the formula

wherein $R_6$ has the meaning given above, and, if desired, catalytically hydrogenating and/or alkylating the reaction products and, if necessary, converting them into the corresponding salts by means of physiologically tolerated acids. In the carboxylic acids used as starting materials the radicals R, $R_1$, $R_2$, $R_3$, $R_4$ and $R_5$ may have, for example, the following meanings:

R: hydrogen, 3- or 4-chloro- or bromo- or fluoro-phenyl, 3- or 4-chloro- or -bromo- or fluoro-benzyl;

$R_1$ and $R_3$ each: hydrogen, methyl, ethyl, phenyl, 2- or 3- or 4-chloro- or bromo- or fluoro-phenyl, 2,3- or 2,4- or 2,5- or 2,6- or 3,4- or 3,5- dichloro- or -dibromo- or -difluoro, phenyl, 2-chloro-4-bromo-phenyl, 2,3,5- or 2,4,5- or 3,4,5-trichloro- or tribromo-phenyl, 3,5-dichloro-4-bromo-phenyl;

$R_2$: phenyl, 2- or 3- or 4-cholor- or bromo- or fluoro-phenyl, 2,3- or 2,4- or 2,5- or 2,6- or 3,4- or 3,5- dichloro- or -dibromo- or difluoro-phenyl, 2-chloro-4-bromo-phenyl, 2,3,5- or 2,4,5- or 3,4,5-trichloro- or tribromo-phenyl, 3,5-dichloro-4-bromo-phenyl;

$R_4$ and $R_5$ each: 2- or 3- or 4-chloro- or bromo- or fluoro-phenyl, 2,3- or 2,4- or 2,5- or 2,6- or 3,4- or 3,5- dichloro- or -dibromo- or difluoro-phenyl, 2-choloro-4-bromo-phenyl, 2,3,5- or 2,4,5- or 3,4,5-trichloro- or tribromophenyl, 3,5-dichloro-4-bromo-phenyl.

The carboxylic acids may be obtained according to known processes, for instance from their nitriles by hydrolyzation which is advantageously carried out by heating them in a mixture of equal parts of sulfuric acid of 50% strength and glacial acetic acid.

The substituted α,β-diphenyl-acrylic acids used, inter alia, as starting substances are advantageously prepared by condensation of corresponding benzaldehydes with molar amounts of triethylamine salts of corresponding phenyl acetic acids in boiling acetic acid anhydride. From these unsaturated acids the α,β-diphenyl-propionic acids may be obtained by catalytic hydrogenation with the aid of Raney nickel as a catalyst.

The carboxylic acids can likewise be reacted in the form of their reactive derivatives such as carboxylic acid halides, carboxylic acid anhydrides, mixed anhydrides with carbonic acid semi-esters, carboxylic acid esters, carboxylic acid imidazolides and the like.

As second reaction component piperazines of the Formula V are mentioned. In the formula the radical $R_6$ may have the following meaning: hydrogen, lower alkyl such as methyl, ethyl, propyl, isopropyl, butyl, isoamyl or hexyl; hydroxy-lower alkyl, for instance, β,γ,-dihydroxypropyl or β-hydroxy-γ-chloropropyl; lower alkoxy-lower alkyl, especially methoxy-methyl, or β-methoxy-ethyl; cyclohexyl; lower alkyl-cyclohexyl such as methyl-cyclohexyl; phenyl-lower alkyl such as benzyl and phenyl-ethyl and halophenyl-lower alkyl, for instance 4-chlorobenzyl.

The reaction of the carboxylic acid with the piperazine base is preferably carried through in the presence of a water binding substance, for instance, a carbodiimide such as dicyclohexyl-carbodiimide and an inert solvent. As such there are mentioned, above all, aliphatic or aromatic ethers, for example dioxane and tetrahydrofurane, methylene-chloride, dimethyl-formamide or acetonitrile. The reaction can be carried out at a low or a moderately elevated temperature, preferably, however, at room temperature. In most cases, the urea that has formed crystallizes out of the reaction mixture and is filtered off. The piperazide can then be obtained by concentrating the filtrate. In many cases it is suitable to use instead of carboxylic acid reactive derivatives thereof. As such, there enter into consideration, above all, the acid chlorides, but likewise other derivatives of carboxylic acids such as, for instance, carboxylic acid fluorides and bromides, carboxylic acid esters, carboxylic acid anhydrides, mixed anhydrides with carbonic acid semi-esters, carboxylic acid azides or carboxylic acid imidazolides.

If acid chlorides are used, which are obtained in the usual manner from the corresponding acids, for instance by causing thionyl-chloride to act thereon, the process of the invention can be materialized by reacting the acid chlorides with the piperazine base in the presence of a solvent. For this purpose, there are suitable, for instance, aliphatic or aromatic hydrocarbons such as benzine, benzene, or toluene, ethers such as diethyl ether, diisopropyl ether, anisol, tetrahydrofurane or dioxane, esters such as ethyl-acetate or butyl-acetate, ketones such as acetone or methyl-ethyl-ketone, amides such as dimethylformamide or nitriles such as acetonitrile. The reaction may be carried out at a low as well as at an elevated temperature. It is of advantage to start the reaction at room temperature and to achieve it by heating, for instance, to the boiling point of the solvent. If the reactants are used in equimolar amounts, the hydrochlorides of the piperazides are formed which—with the appropriate selection of the solvents—often separate in crystalline form and can be isolated by filtration. If no crystallization takes place, the reaction product is suitably isolated in the form of the free piperazide. It is likewise possible to capture the hydrogen halide formed in the course of the reaction by an acid-binding agent. For this purpose, there are appropriate, for instance, inorganic bases such as sodium carbonate or tertiary amines such as triethylamine, dimethyl-aniline or pyridine or likewise an excess of the piperazine taking part in the reaction. In these cases the free carboxylic acid piperazides are formed which, in most cases, are maintained in solution and which are obtained therefrom in the usual manner, for instance by concentrating the solution by evaporation. When, for the reaction, the piperazine is used in the form of a salt, the acid-binding agent is suitably used in an appropriate amount in order to liberate the base from the piperazine salt. The free carboxylic acid piperazides are then likewise obtained which may be isolated as described above. In an analogous manner, other reactive carboxylic acid derivatives may likewise be reacted with the corresponding piperazines, for instance the above-mentioned carboxylic acid bromides or fluorides, carboxylic acid anhydrides, mixed anhydrides of carbonic acid semiesters, carboxylic acid azides or carboxylic acid imidazolides.

From the carboxylic acid esters of low aliphatic alcohols the piperazides can be obtained according to the invention by simply heating with the corresponding piperazine, which in such a case is advantageously used in excess. It is suitable to operate in a closed system, since for the reaction temperatures from 180 to 250° C. are of advantage. In some cases it may be favorable to use a solvent or diluent, such as, for example, alcohols, openchain or cyclic ethers, aliphatic or aromatic hydrocarbons. The carboxylic acid piperazides or their salts can be isolated from the reaction mixture in the usual manner.

If the reacted carboxylic acid has in its aliphatic chain a double linkage, it can be hydrogenated, following to the reaction with the piperazine, to the corresponding saturated carboxylic acid piperazide. Appropriate solvents in the presence of which it is suitable to operate, are alcohols such as methanol, esters such as ethyl acetate, ethers such as dioxane and the like. As catalysts there are used precious metals such as palladium or platinum or, above all, finely divided nickel. In order to ensure a sufficiently rapid course of the reaction, it is of advantage to carry out the hydrogenation at a weekly elevated temperature and under increased pressure.

If the carboxylic acid piperazide prepared according to the process of the invention carries at the basic nitrogen atom a radical which may be reductively split, for instance the benzyl group, the latter can still be eliminated by hydrogenation. In this case, it is suitable to operate in the presence of a solvent, lower alcohols such as methanol, ethanol or isopropanol, but likewise esters such as ethyl acetate, ethers such as dioxane or lower aliphatic carboxylic acids, such as glacial acetic acid being particularly suitable. It is of advantage to react the carboxylic acid piperazides in the form of salts, for instance in the form of the hydrochlorides. As catalysts are used finely divided precious metals such as paladium or platinum. When the free bases are reacted, finely divided nickel may likewise be used. The reaction conditions are so chosen that the velocity of hydrogenation is not too low. It may, therefore, be advisable to operate at a weakly elevated temperature and under increased pressure. In many cases, however, normal conditions are sufficient.

If the basic nitrogen atom of the carboxylic acid piperazide obtained according to the process of the invention is unsubstituted, it can still be alkylated in an appropriate way. For this purpose, the base is reacted according to known methods with alkylating agents, such as, for instance, alkyl halides, dialkyl sulfates, alkyl esters of sulfonic acids or epoxides.

The products obtained according to the process of the present invention are colorless, solid substances or viscous oils which cannot be distilled. As monoacid bases they form salts with inorganic or organic acids which salts are in most cases obtained in crystalline form. According to the type of substituent and the acid used for salt formation, they are more or less soluble in water. As acids suitable for salt formation, there are mentioned, for instance, hydrochloric acid, sulfuric acid, phosphoric acid, amido sulfonic acid, acetic acid, propionic acid, butyric acid, aceturic acid, stearic acid, tartaric acid, maleic acid, citric acid, aspartic acid, p-aminobenzoic acid, salicylic acid and the like.

The carboxylic acid piperazides prepared according to the process of the present invention as such, or in the form of their salts with non-toxic acids, can be used as medicaments. They show a strong anthelmintic action directed, above all, on various kinds of liver flukes. They are especially distinguished by their action on the small liver fluke or lancet fluke (*Dicrocoelium dendriticum*). The infection of domestic animals by liver flukes is of great economic importanc in all countries of the world. Whereas a great number of preparations is already known as being effective on the large liver fluke (*Fasciola hepatica*) and used on a large scale in veterinary practice, no agent specifically acting on the small or lancet fluke is hitherto known. Up to now, experimental chemotherapeutical tests could only be carried out to a small extent on naturally infected sheep, since the hitherto obtained results of scientific examinations concerning the biology of the lancet fluke were not sufficient to build up the total development cycle under laboratory conditions. Only the newer findings by Hohorst and Graefe (Naturweiss. 48: 229; 1961) concerning the decisive part played by the ants in the development of the lancet fluke and the findings by Hohorst and Lämler (Z. Tropenmd., 1962, in print) concerning the qualification of various laboratory animals as final hosts for *Dicrocoelium dendriticum* gave the possibility of building up in the laboratory the cycle of the lancet fluke and of carrying out experimental chemotherapeutical serial tests.

Within the scope of said examinations the excellent and surprising effect of the products of the invention was found. The results thereof are shown in the following. The chemotherapeutical tests were carried out on golden hamsters, rabbits, sheep and bovines infected for this purpose with *Dicrocoelium dendriticum*. The tested compounds prepared according to the process of the invention were orally given to the animals once a day for three successive days. When golden hamsters were used, the success attained by the treatment was stated by an examination of the feces with the aid of the Telemann process prior to the treatment and by two further examinations on the 14th and 20th days after the treatment and by autopsy of the animals. As a curative dose in the treatment of golden hamsters, the dose was determined which was sufficient to remove the infestation by lancet flukes. The following Table I shows the values ascertained for some of the products obtained according to the process of the present invention when given to golden hamsters.

TABLE I

[Results of chemotherapeutical examinations on golden hamsters (parasite: *Dicrocoelium dendriticum*)]

| Products of the invention | Curative dose (mg./kg. of body weight) per os |
|---|---|
| α,β-bis-(4-chlorophenyl)-propionic acid-N'-methyl-piperazide-maleate | 3×100 |
| bis-(4-chlorobenzyl)-acetic acid-N'-methylpiperazide-maleate | 3×75 |
| α,β-bis-(3,4-dichlorophenyl)-acrylic acid-N'-methyl-piperazide-hydrocholride | 3×100 |
| β,β,β-tris-(4-chlorophenyl)-propionic acid-N'-(β-hydroxyethyl)-piperazide-hydrochloride | 3×50 |
| β,β-bis(4-chlorophenyl)-β-phenyl-propionic acid-piperazide-maleate | 3×50 |

Table II shows the values for β,β,β-tris - (4-chlorophenyl) - propionic acid-N'-methyl-piperazide-hydrochloride ascertained in several kinds of animals. As a criterion of efficiency of a compound, there was determined in the tests on rabbits the excretion of eggs in the feces over a period of 4 weeks, or when the animals were killed after this period of time, the still existing extent of infestation with lancet flukes. With rabbits, sheep and bovines the curative dose corresponds to the dose upon administration of which eggs of the lancet fluke can no more be detected in the feces of the animals even 4 weeks after treatment, with the aid of a quantitative sediment process, or in the case of autopsy—as far as the latter is applied with sheep and bovines—no lancet flukes can be detected in the bile-ducts of the liver.

TABLE II

[Results of the chemotherapeutical examinations with β,β,β-tris - (4-chlorophenyl)-propionic acid-N'-methyl-piperazide-hydrochloride (parasite: *Dicrocoelium dendriticum*)]

| Kind of animal | Minimum curative dose (mg./kg. of body weight) per os |
|---|---|
| Golden hamster | 1×30<br>3×15 |
| Rabbit | 1×30 |
| Sheep | 1×15–17.5 |
| Bovine | 1×12–15 |

The products of the invention may be applied as such or in the form of the corresponding salts, if desired with admixture of pharmaceutically usual inert auxiliaries and carrier substances orally or parenterally, preferably, however, orally. They can be prepared especially in the form of tablets or suspendable powders which may be given to the animals per se or in admixture with the food. A powder suspendable in water may contain in addition to the products of the invention likewise finely divided silicic acid or coco-Lorol-sulfonate as dispersing agent. For the preparation of tablets the substances usually used as basic ingredients for tablets, for instance corn starch, lactose, pectines, especially ultra-amylopectine (Na-amylopectine-glycolate), talc and the like may be used. In certain therapeutical cases the addition of other anthelmintics and/or antibiotics may be of interest. With veterinary-medicinal indication a dosage unit form may contain about 0.5 to 2 grams of the active substance.

The galenic preparations are prepared according to the usual methods. When the products of the invention are used in the form of—if desired—suspendable powders, these may contain, for instance, about 5 to 90%, preferably however 30 to 80 or 40 to 60% of the anthelmintic substance.

Tablets which may be made into a suspension contain, for instance, between 5 and 60%, preferably between 20 and 50%, of the active substance. The active substances may also be applied in the form of solutions or suspensions, the content of active substance of these preparations depending on the solubility of the piperazides used in each case.

The following examples illustrate the invention:

EXAMPLE 1

*Bis-(3,4-dichlorobenzyl)-acetic acid-N'-methyl-piperazide*

18.9 grams of bis - (3,4-dichlorobenzyl) - acetic acid (melting point 117° C.) and 5 grams of N-methyl-piperazine are dissolved in 60 cc. of dioxane and 11.3 grams of dicyclo-hexyl-carbodiimide are added. The solution is stirred for 4 hours at room temperature whereby the dicyclohexyl-urea formed separates. It is filtered off with suction and the filtrate is evaporated to dryness. The residue is dissolved in ether, washed with water and dried over sodium sulfate. After repeated evaporation the remaining base is taken up with alcohol, neutralized by means of an alcoholic solution of hydrogen chloride and the bis - (3,4-dichlorobenzyl) - acetic acid-N'-methyl-piperazide-hydrochloride is crystallized, by adding ether until turbidity sets in. It can be dissolved and allowed to crystallize again from acetone/ether and forms colorless crystals which melt at 185–187° C. The free bis-(3,4 - dichlorobenzyl) - acetic acid-N'-methyl piperazide crystallizes out from benzine and melts at 114–116° C.

EXAMPLE 2

*Bis-(4-chlorobenzyl)-acetic acid-N'-methyl-piperazide*

11 grams of N-methyl-piperazine are dropped into a solution of 32.8 grams of bis-(4-chlorobenzyl) - acetylchloride (prepared from bis - (4-chlorobenzyl) - acetic acid of a melting point of 124–126° C.) in 40 cc. of acetone, whereby the temperature rises to about 55° C. The mixture is stirred for 1 hour without heating, the solution is evaporated and the oily residue is dissolved in water. The base is liberated from the solution by adding 2 N-sodium hydroxide solution and taken up with ethyl-acetate. After washing with water and drying over sodium sulfate the solvent is completely distilled off. The residue solidifies in crystalline form. After recrystallization from benzine, 34 grams of bis - (4-chloro-benzyl) - acetic acid-N'-methyl-piperazide of a melting point of 75–77° C. are obtained. By adding an equimolar amount of maleic acid to an alcoholic solution of the base and adding ether until turbidity sets in, the bis-(4-chlorobenzyl) - acetic acid-N'-methyl - piperazide - maleate is obtained. It forms colorless crystals melting at 140–141° C.

In an analogous manner there are obtained:

α,β-Bis-(4 - chlorophenyl) - propionic acid - N'-methyl-piperazide of a melting point of 134° C. (from cyclohexane) from α,β - bis - (4-chlorophenyl) - propionic acid chloride (prepared from α,β - bis - (4-chlorophenyl)-propionic acid of a melting point of 119–123° C.) and N-methyl-piperazine.

The maleate (from ethanol/ether) melts at 173–175° C.

α,β-Bis-(4-chlorophenyl)-valeric acid-N'-methyl-piperazide of a melting point of 136–138° C. (from cyclohexane) from α,β-bis-(4-chlorophenyl)-valeric acid chloride (prepared from α,β-bis-(4-chlorophenyl)-valeric acid of a melting point of 170–172° C.) and N-methyl-piperazine. The maleate (from acetone) melts at 201–203° C.

α - (4-chlorophenyl)-β-(3,4-dichlorophenyl)-propionic acid-N'-methyl-piperazide of a melting point of 134–137° C. (from bezine) from α-(4-chlorophenyl)-β-(3,4-dichlorophenyl)-propionic acid chloride (prepared from α-(4-chlorophenyl)-β-(3,4-dichlorophenyl)-propionic acid of a melting point of 139–142° C.) and N-methyl-piperazine.

The maleate (from ethanol/ether) melts at 143–145° C.

α,β - bis-(4 - chlorophenyl)-acrylic acid-N'-isopropyl-piperazide (viscous oil) from α,β-bis-(4-chlorophenyl)-acrylic acid chloride (prepared from α,β-bis-(4-chlorophenyl)-acrylic acid of a melting point of 158–160° C.) and N-isopropyl-piperazine.

The maleate (from ethanol) melts at 208–210° C.

EXAMPLE 3

β,β,β-Tris-(4-chlorophenyl)-propionic acid-N'-methyl-piperazide 50.2 grams (0.1 mol) of β,β,β-tris-(4-chlorophenyl)-propionic acid chloride (containing 1 mol of crystalline benzene; melting point 110 to 112° C., obtained from β,β,β-tris-(4-chlorophenyl)-propionic acid of a melting point of 185–186° C.) are dissolved in 90 cc. of acetone and, while stirring, a solution of 10 grams (0.1 mol) of N-methyl-piperazine in 30 cc. of acetone is dropwise added. The temperature increases to 50° C. in 5 minutes after the dropping in is terminated, crystallization of the hydrochloride sets in. It is stirred for 1 hour, cooled and the product obtained by suction-filtering is washed with acetone and diisopropyl ether. After drying at 90° C. the yield amounts to 44.8 grams (85.5% of the theory). The melting point of the thus obtained β,β,β-tris-(4-chlorophenyl)-propionic acid-N'-methyl-piperazide-hydrochloride amounts to 265–267° C. and after a single recrystallization of the product from about 5 to 6 times its amount of ethanol, the melting point amounts to 267–269° C. The base is obtained by liberation with dilute sodium hyroxide solution. After recrystallization from ethyl-acetate the base melts at 213–215° C.

In an analogous manner there are obtained:

β,β - Bis - (4 - fluorophenyl)-β-(4-chlorophenyl)-propionic acid-N'-methyl-piperazide-hydrochloride of a meltting point of 253–254° C. (melting point of the free base 133–134° C.) from β,β-bis-(4-fluorophenyl)-β-(4-chlorophenyl)-propionic acid of a melting point of 109–110° C., and N-methyl-piperazine.

β,β-Bis - (4 - chlorophenyl)-β-phenylpropionic acid-N'-methyl-piperazide hydrochloride of a melting point of 250° C. (melting point of the free base 166–167° C.) from β,β-bis - (4 - chlorophenyl)-β-phenylpropionic acid chloride (prepared from β,β-bis-(4-chlorophenyl)-β-phenylpropionic acid of a melting point of 180–182° C.) and N-methyl-piperazine.

β - (4 - chlorophenyl) - β,β-diphenyl-propionic acid-N'-methyl-piperazide hydrochloride of a melting point of 150° C. (decomp.) from β-(4-chlorophenyl)-β,β-diphenyl-propionic acid chloride (prepared from β-(4-chlorophenyl)-β,β-diphenyl-propionic acid of a melting point of 183–185° C.) and N-methyl-piperazine.

Bis-(3,4 - dichlorobenzyl)-acetic acid-N'-methyl-piperazide-hydrochloride of a melting point of 186–187° C. (from acetone/ether; melting point of the free base (from petroleum ether) 114–116° C.) from bis-(3,4-dichlorobenzyl)-acetyl-chloride (prepared from bis-(3,4-dichlorobenzyl)-acetic acid of a melting point of 117° C.) and N-methyl-piperazine.

Bis - (2,4-dichlorobenzyl)-acetic acid-N'-methyl-piperazide-hydrochloride of a melting point of 212–214° C. (from ethanol; melting point of the free base (from petroleum ether) 111–113° C.) from bis-(2,4-dichlorobenzyl)-acetyl-chloride (prepared from bis-2,4-dichlorobenzyl)-acetic acid of a melting point of 155–157° C.) and N-methyl-piperazine.

α,β-Bis-(4-chlorophenyl)-acrylic acid-N'-methyl-piperazide-hydrochloride of a melting point of 238–240° C. (from ethyl-acetate/ether; melting point of the free base 124–125° C.) from α,β-bis-(4-chlorophenyl)-acrylic acid of a melting point of 158–160° C., and N-methyl-piperazine.

α,β - Bis-(4-chlorophenyl)-acrylic acid-N'-benzyl-piperazide-hydrochloride of a melting point of 246–248° C. (from ethanol/water) from α,β-bis-(4-chlorophenyl)-acrylic acid chloride and N-benzyl-piperazine.

α,β-Bis - (4-chlorophenyl)-acrylic acid-N'-ethyl-piperazide-hydrochloride of a melting point of 240–242° C. (from ethyl-acetate/ether) from α,β-bis-(4-chlorophenyl)-acrylic acid chloride and N-ethyl-piperazine.

α - (4 - chlorophenyl) - β - (3,4-dichlorophenyl)-acrylic acid - N' - methyl - piperazide-hydrochloride of a melting point of 166–168° C. (from ethyl-acetate) from α-(4-chlorophenyl) - β - (3,4-dichlorophenyl)-acrylic acid chloride (prepared from α-(4-chlorophenyl)-β-(3,4-dichlorophenyl)-acrylic acid of a melting point of 150–153° C.) and N-methyl-piperazine.

α-(4-chlorophenyl)-β-(2,4 - dichlorophenyl) - acrylic acid-N'-methyl piperazide-hydrochloride of a melting point of 188–190° C. (decomp.) (from acetone; melting point of the free base (from cyclohexane) 160–162° C. from α - (4-chlorophenyl)-β-(2,4-dichlorophenyl)-acrylic chloride (prepared from α-(4-chlorophenyl) - β - (2,4-dichlorophenyl)-acrylic acid of a melting point of 157–160° C.) and N-methyl-piperazine.

α,β-Bis-(3,4-dichlorophenyl)-acrylic acid - N' - methyl-piperazide-hydrochloride of a melting point of 241–243° C. (from acetone) from α,β - bis - (3,4 - dichlorophenyl) - acrylic acid chloride (prepared from α,β - bis-(3,4-dichlorophenyl)-acrylic acid of a melting point of 164–167° C.) and N-methyl-piperazine.

α-(4-chlorophenyl)-β-(2,4-dichlorophenyl) - propionic acid-N'-methyl-piperazide-hydrochloride of a melting point of 207–209° C. (from ethanol/ether; melting point of the free base (from ethyl-acetate) 165–166° C.) from α-(4-chlorophenyl)-β-(2,4-dichlorophenyl)-propionic acid chloride (prepared from α-(4-chlorophenyl) - β - (2,4-dichlorophenyl)-propionic acid of a melting point of 171–174° C.) and N-methyl-piperazine.

α,β-Bis-(3,4-dichlorophenyl)-propionic acid-N'-methyl-piperazide-hydrochloride of a melting point of 251–252° C. (from acetone/ether; melting point of the free base (from ethyl-acetate/benzine) 141–142° C.) from α,β-bis-(3,4-dichlorophenyl)-propionic acid chloride (prepared from α,β-bis-(3,4-dichlorophenyl)-propionic acid of a melting point of 149–151° C.) and N-methyl-piperazine.

β,β,β-Tris-(4-chlorophenyl)-propionic acid - N' - (β-methoxy-ethyl)-piperazide-hydrochloride of a melting point of 220–222° C. (from alcohol) from β,β,β-tris-(4-chlorophenyl)-propionic acid chloride and N'-(β-methoxy-ethyl)-piperazine.

EXAMPLE 4

β,β-Bis-(4-chlorophenyl)-β-(3-fluorophenyl)-propionic acid-N'-methyl-piperazide 60 grams of β,β-bis-(4 - chlorophenyl) - β - (3 - fluorophenyl)-propionic acid chloride (obtained from β,β-bis-(4-chlorophenyl)-β-(3-fluorophenyl) - propionic acid) are dissolved in 50 cc. of benzene and 15 grams of N-methyl-piperazine are dropwise added. The solution is heated for 3 hours under reflux, treated with dilute sodium hydroxide solution or sodium carbonate solution and the separated benzene layer is washed with water. The free base obtained after concentration of the benzene phase melts at 157–158° C., after having been recrystallized from ethanol. With the aid of methanolic hydrochloric acid and ether the β,β-bis-(4-chlorophenyl)-β-(3-fluorophenyl) - propionic acid-N'-methyl-piperazide-hydrochloride is obtained in a yield of 75% and, after having been recrystallized from ethanol/ether, it melts at 239–240° C.

In an analogous manner there are obtained:

β,β,β-Triphenyl - propionic acid-N'-methyl-piperazide-hydrochloride of a melting point of 253–254° C. (from methanol/diisopropyl ether) from β,β,β - triphenyl - propionic acid chloride (melting point 130° C.) and N-methyl-piperazine.

β,β-Bis-(4 - bromophenyl)-β-(4 - chlorophenyl) - propionic acid-N'-methyl-piperazide-maleate of a melting point of 216° C. (decomposition) (from ethanol/water; melting point of the free base 216–219° C.) from β,β-bis-(4-bromophenyl)-β-(4-chlorophenyl) - propionic acid chloride (melting point 108–110° C., prepared from β,β-bis-(4-bromophenyl)-β-(4-chlorophenyl) - propionic acid of a melting point of 206–208° C.) and N-methyl-piperazine.

β-(3-chlorophenyl)β,β-diphenyl-propionic acid - N'-methyl-piperazide-maleate of a melting point of 190°–191° C. (from methanol/ether) from β-(3-chlorophenyl)-β,β-diphenyl-propionic acid chloride (obtained from β-(3-chlorophenyl)-β,β-diphenyl-propionic acid of a melting point of 115° C.) and N-methyl-piperazine.

β,β-Bis-(4-fluorophenyl)-β-phenyl-propionic acid - N'-methyl-piperazide-hydrochloride of a melting point of 258–260° C. (from ethanol/ether) from β,β-bis-(4-fluorophenyl)-β-phenyl-propionic acid chloride (melting point 103–105° C., obtained from β,β-di-(4-fluorophenyl)-β-phenyl-propionic acid of a melting point of 162° C.) and N-methyl-piperazine.

β-(3-chlorophenyl)-β,β-diphenyl-propionic acid - N'-benzyl-piperazide-hydrochloride of a melting point of 157° C. (decomposition) (from alcohol/ether) from β-(3-chlorophenyl)-β,β-diphenyl-propionic acid chloride and N-benzyl-piperazine.

β,β-Bis-(4-bromophenyl)-β-(4-chlorophenyl)-propionic acid-N'-benzyl-piperazide-hydrochloride of a melting point of 238–240° C. (from β,β-bis-(4-bromophenyl)-β-(4-chlorophenyl)-propionic acid chloride) and N-benzyl-piperazine.

β,β,β-Tris-(4-chlorophenyl)-propionic acid - N'-ethyl-piperazide-hydrochloride of a melting point of 230–232° C. (melting point of the free base 170°) from β,β,β-tris-(4-chlorophenyl)-propionic acid chloride and N-ethyl-piperazine.

β,β,β-Tris-(4-chlorophenyl)-propionic acid - N' - (β-hydroxy-ethyl)-piperazine-hydrochloride of a melting point of 166° C. (decomposition) (from ethanol/diisopropyl ether) from β,β,β-tris-(4-chlorophenyl)-propionic acid chloride and N-(β-hydroxy-ethyl)-piperazine.

β-(2,4-dichlorophenyl)-β-(4-chlorophenyl)-propionic acid - N'-methyl-piperazide-hydrochloride of a melting point of 243–244° C. (from ethanol) from β-(2,4-dichlorophenyl)-β-(4-chlorophenyl)-propionic acid chloride and N-methyl-piperazine.

EXAMPLE 5

β,β-Bis-(4-chlorophenyl)-propionic acid-N'-methyl-piperazide 30 grams of β,β-bis-(4-chlorophenyl)-propionic acid are boiled in 100 cc. benzene with 13 grams of thionyl chloride for 1 hour under reflux. 20 cc. of benzene are then removed by distillation, 11 grams of N-methyl-piperazine are added, the mixture is extracted with sodium carbonate solution and water and the residue remaining after elimination of the benzene by distillation is taken up in acetone. Gaseous hydrochloric acid is introduced into the clarified acetone solution until the latter shows a weakly acid reaction to Congo paper; the forming precipitate is filtered off with suction and dried under reduced pressure. The yield in β,β-bis(4-chlorophenyl)-propionic acid-N'-methyl-piperazide-hydrochloride amounts to 40 grams; the melting point amounts to 236–238° C.

EXAMPLE 6

β,β,β-Tris-(4-chlorophenyl)-propionic acid-N'isopropyl-piperazide 21 grams of β,β,β-tris-(4-chlorophenyl)-propionic acid chloride are dissolved in 50 cc. of benzene and 5 grams of triethylamine and 6.4 grams of N-isopropyl-piperazine (boiling point 169–171° C.) are dropwise added at 60° C. The mixture is heated for 2 hours under reflux, after cooling, water and sodium hydroxide solution are added, the separated benzene phase is washed with water, dried over sodium sulfate and concentrated. By means of alcoholic hydrochloric acid crystals of β,β,β-tris-(4-chlorophenyl)-propionic acid-N'-isopropyl-piperazide-hydrochloride are obtained in a yield of 77%. After having been recrystallized from ethanol/ether they melt at 240–242° C.

In an analogous manner there are obtained:

β,β,β-Tris-(4-chlorophenyl)-propionic acid - N' - cyclohexyl-piperazide-hydrochloride of a melting point of 289–291° C. from β,β,β-tris-(4-chlorophenyl)-propionic acid chloride and N-cyclohexyl-piperazine (boiling point 114–115° C.; melting point of the hydrochloride 283° C. (decomposition)).

β,β - Bis - (4-fluorophenyl)-β-(4-chlorophenyl)-propionic acid-N'-benzyl-piperazide-hydrochloride of a melting point of 224° C. from β,β-bis-(4-fluorophenyl)-β-(4-chlorophenyl)-propionic acid chloride and N-benzyl-piperazine.

EXAMPLE 7

β,β,β-Tris-(4-chlorophenyl)-propionic acid-N'-butyl-piperazide

A suspension is formed from 6.45 grams of N-butyl-piperazine-dihydrochloride in 50 cc. of benzene and 9 grams of triethylamine are added. 12.6 grams of β,β,β-tris-(4-chlorophenyl)-propionic acid chloride dissolved in benzene are added and the whole is heated for 3 hours under reflux. After cooling, water is added and the suspension is rendered alkaline by adding 2 N sodium hydroxide solution, the benzene layer is separated. The benzenic solution is washed with water, dried over sodium sulfate and concentrated. By means of methanolic hydrochloric acid crystals of β,β,β-tris-(4-chlorophenyl)-propionic acid-N'-butyl-piperazide-hydrochloride are obtained which, after having been recrystallized from alcohol/ether melt at 221–222° C. Yield 69%.

In an analogous manner there are obtained:

β,β,β - Tris-(4-chlorophenyl)-propionic acid-N'-propyl-piperazide-hydrochloride of a melting point of 277–280° C. (from methanol/ether) from β,β,β-tris-(4-chlorophenyl)-propionic acid chloride and N-propyl-piperazine-dihydrochloride.

β,β,β-Tris-(4-chlorophenyl)-propionic acid-N'-isobutyl-piperazide-hydrochloride of a melting point of 281–282° C. (from methanol/ether) from β,β,β-tris-(4-chlorophenyl)-propionic acid chloride and N-isobutyl-piperazine-dihydrochloride (melting point 245° C. (decomposition)).

EXAMPLE 8

(a) β-4-(chlorophenyl)-β,β-diphenyl-propionic acid-N'-benzyl-piperazide 41 grams of β-(4-chlorophenyl)-β,β-diphenyl-propionic acid chloride are dissolved in 70 cc. of acetone and 20.4 grams of N-benzyl-piperazine are dropwise added; heating to 50° C. occurs. The mixture is still heated for 1 hour under reflux, after cooling and concentration shaken with dilute sodium hydroxide soltion and chloroform and the organic phase is concentrated. The base does not crystallize. By acidification with methanolic hydrochloric acid and addition of ether crystals of β-(4-chlorophenyl)-β,β-diphenyl-propionic acid-N'-benzyl-piperazide - hydrochloride are obtained which, after having been recrystallized from alcohol/ether melt at 168–170° C. Yield 78%.

(b) β-(4-chlorophenyl)-β,β-diphenyl-propionic acid piperazide 30 grams of β-(4-chlorophenyl)-β,β-diphenyl-propionic acid-N'-benzyl-piperazide-hydrochloride are hydrogenated in 450 cc. of isopropyl alcohol with palladium at 60° C.; after one hour the theoretical amount of hydrogen is taken up. The catalyst is filtered off with suction, the filtrate is concentrated and the base is liberated by means of sodium hydroxide solution. Ether and methanolic hydrochloric acid are added to the base until the neutral point is reached. The crystals of β-(4-chlorophenyl)-β,β-diphenyl-propionic acid piperazide-hydrochloride, which form after a prolonged time, melt at 154° C. (decomposition), after having bene recrystallized from ethyl-acetate/petroleum ether. Yield 78%.

EXAMPLE 9

(a) *β,β,β-Tris-(4-chlorophenyl)-propionic acid-N'-benzyl-piperazide*

85 grams of β,β,β-tris-(4-chlorophenyl)-propionic acid chloride are dissolved in 250 cc. of benzene and in the boiling heat 36 grams of N-benzyl-piperazine are added. The mixture is stirred for 2 hours at 70° C., after cooling treated with 500 cc. of 2 N-sodium hydroxide solution, washed with water and the benzene layer is concentrated. After addition of methanolic hydrochloric acid to the residue, the latter leads to crystals of β,β,β-tris-(4-chlorophenyl) - propionic acid-N'-benzyl-piperazide-hydrochloride, which after having been recrystallized from methanol melts at 240–242° C. Yield 86%.

(b) *β,β,β-Tris-(4-chlorophenyl)-propionic acid-piperazide*

30 grams of β,β,β-tris-(4-chlorophenyl)-propionic acid-N'-benzyl-piperazide-hydrochloride are hydrogenated in 250 cc. of isopropyl alcohol on palladium black at 50° C. After 5 hours the theoretical amount of hydrogen is taken up. The mass is filtered, concentrated and the base is liberated by means of 2 N-sodium hydroxide solution. After elimination of the ether by distillation, the remaining residue crystallizes and, after having been recrystallized from ethyl acetate/petroleum ether, it melts at 167–169° C. By treating the substance with methanolic hydrochloric acid and ether there is obtained β,β,β-tris-(4-chlorophenyl) - propionic acid-piperazine-hydrochloride-tetrahydrate of a melting point of 94° C.

In an analogous manner there are obtained:

β,β-Bis-(4-fluorophenyl)-β-phenyl - propionic acid - N'-benzyl-piperazide-hydrochloride of a melting point of 193–194° C. (from methanol/ether) from β,β-bis-(4-fluorophenyl)-β-phenyl-propionic acid chloride and N-benzyl-piperazine. Therefrom, by hydrogenation, β,β-bis-(4-fluorophenyl)-β-phenyl - propionic acid piperazide-hydrochloride of a melting point of 250° C. (from ethyl-acetate/petroleum ether).

β,β-Bis-(4-chlorophenyl)-β-phenyl-propionic acid - N'-benzyl-piperazide-hydrochloride of a melting point of 190–192° C. (from methanol/ether) from β,β-bis-(4-chlorophenyl)-β-phenyl-propionic acid chloride and N-benzyl-piperazine. Therefrom, by hydrogenation, β,β-bis-(4-chlorophenyl)-β-phenyl-propionic acid piperazide-maleate of a melting point of 169–170° C. (from alcohol/ether).

β,β,β-Triphenyl-propionic acid-N'-benzylpiperazide-hydrochloride of a melting point of 229–231° C. (from alcohol) from β,β,β-triphenyl-propionic acid chloride and N-benzyl-piperazine. Therefrom, by hydrogenation, β,β,β-triphenyl-propionic acid-piperazide-hydrochloride of a melting point of 230–232° C. (from alcohol).

EXAMPLE 10

(a) *Bis-(4-chlorobenzyl)-acetic acid-N'-benzyl-piperazide*

8.8 grams of N-benzyl-piperazine are dropwise added to a solution of 15.2 grams of bis-(4-chlorobenzyl)-acetyl-chloride (prepared from bis-(4-chlorobenzyl)-acetic acid of a melting point of 125–126° C.) in 60 cc. of acetone, whereby the temperature is raised to about 50° C. The mixture is still stirred for 1 to 2 hours at room temperature and then diluted by means of water and 2 N-sodium hydroxide solution. The base separates in the form of an oil. It is taken up with ether, the solution is washed with water and evaporated. The residue of the ether solution crystallizes from cyclohexane. 16.5 grams of bis-(4-chlorobenzyl)-acetic acid-N'-benzyl-piperazide are obtained in the form of colorless crystals which melt at 116–118° C. The hydrochloride (from ethanol/diisopropyl ether) melts at 187–189° C.

(b) *Bis-(4-chlorobenzyl)-acetic acid-piperazide*

21.5 grams of bis-(4-chlorobenzyl)-acetic acid-N'-benzyl-piperazide are dissolved in 200 cc. of methanol and hydrogenated at 60° C. and under a gauge pressure of 100 atmospheres with Raney nickel as a catalyst. After elimination of the solvent by distillation the bis-(4-chlorobenzyl)-acetic acid piperazide is obtained as a viscous oil (15 grams). The oxalate (from alcohol) decomposes at 183–185° C., the maleate (from acetone/ether) melts at 144–145° C.

EXAMPLE 11

*β,β,β-Tris-(4-chlorophenyl)-propionic acid-N'-(β-hydroxy-ethyl)-piperazide*

(a) 9 grams of β,β,β-tris-(4-chlorophenyl)-propionic acid piperazide are heated to 120° C. with 4 cc. of ethylene-oxide in 100 cc. of benzene for 5 hours in the autoclave. The residue remaining after evaporation is dissolved in ether and acidified by means of methanolic hydrochloric acid. The β,β,β-tris-(4-chlorophenyl)-propionic acid-N'-(β-hydroxy-ethyl)-piperazide - hydrochloride obtained in a yield of 59%, after having been recrystallized from alcohol/ether, melts at 167° C. (decomposition).

(b) 11.8 grams of β,β,β-tris-(4-chlorophenyl)-propionic acid piperazide are heated for 4 hours while stirring and under reflux with 2 grams of ethylene-chlorohydrin, 1.4 grams of potassium hydroxide and 50 cc. of benzene. After cooling, the substance is washed with water, dried over sodium sulfate and the solution is concentrated. From the base which is obtained in the form of an oil there are obtained by means of methanolic hydrochloric acid in a yield of 63% crystals of β,β,β-tris-(4-chlorophenyl)-propionic acid-N'-(β'-hydroxy-ethyl)-piperazide-hydrochloride, which after having been recrystallized from alcohol/diisopropyl-ether, melt at 165–166° C. (decomposition).

EXAMPLE 12

*α-(4-chlorophenyl) - β - (3,4-dichloro-phenyl)-propionic acid-N'-methyl-piperazide-maleate*

2 grams of α-(4-chlorophenyl)-β-(3,4-dichlorophenyl)-acrylic acid-N'-methyl-piperazide are dissolved in 100 cc. of methanol and hydrogenated at 60° C. and under a pressure of 100 atmospheres by means of Raney nickel as a catalyst. The absorption of hydrogen terminated, the filtered solution is considerably evaporated and the residue is treated with 2 N-sodium hydroxide solution and ether. After distillation, the α-(4-chlorophenyl)-β-(3,4-dichlorophenyl)-propionic acid - N' - methyl-piperazide remains back and is converted into the maleate by adding maleic acid and ether. The maleate melts at 143–144° C. The yield amounts to 1.4 grams.

EXAMPLE 13

*α,β-Bis-(4-chlorophenyl)-propionic acid-piperazide*

To a solution of 1.5 grams of anhydrous piperazine in 100 cc. of benzene there are added 5 grams of α,β-bis-(4-chlorophenyl)-propionic acid, whereby the salt crystallizes out. A solution of 4.1 grams of dicyclohexyl-carbodiimide in 20 cc. of benzene is added while stirring and the reaction mixture is maintained for 3 hours at 75° C.

After cooling, the mixture is filtered off with suction, the solvent is evaporated and the residue is taken up with ether. After washing with water the piperazide is extracted from the ether solution by means of 2 N-acetic acid. It is set free again by means of dilute sodium hydroxide solution, taken up with ether and converted into the maleate. 1.5 grams of α,β-bis-(4-chlorophenyl)-propionic acid-piperazide-maleate are formed melting at 167–168° C.

EXAMPLE 14

*β,β,β-Tris-(4-chlorophenyl)-propionic acid-N'-methyl-piperazide*

8.4 grams of β,β,β-tris-(4-chlorophenyl)-propionic acid-methyl ester (prepared from the β,β,β-tris-(4-chlorophenyl)-propionic acid chloride and methanol, melting point 147–149° C.) are heated in the sealed tube for 12 hours to 220° C. with 12 cc. of methyl-piperazine. After cooling, the reaction mixture is poured into water and the precipitated oil is taken up with ethyl-acetate which is washed with water and again evaporated after drying. In order to eliminate starting material which did not react, the product is triturated with ether and filtered off with suction. 4 grams of β,β,β-tris-(4-chlorophenyl)-propionic acid-N'-methyl-piperazide of a melting point of 212–214° C. are obtained.

EXAMPLE 15

*α(4-chlorophenyl) - β - (2,4-dichlorophenyl)-acrylic acid-N'-methyl-piperazide hydrochloride*

6.6 grams of α-(4-chlorophenyl)-β-(2,4-dichlorophenyl)-acrylic acid and 2.04 grams of acetic acid anhydride are dissolved in 30 cc. of benzene and heated for 6 hours under reflux. After evaporation under reduced pressure there remain behind 6.6 grams of α-(4-chlorophenyl)-β-(2,4-dichlorophenyl)-acrylic acid anhydride in the form of a yellow viscous oil.

The anhydride is again dissolved in 50 cc. of benzene and a solution of 2.2 grams of N-methyl-piperazine in 10 cc. of benzene is dropwise added, whereby the temperature is slightly raised. After again heating to the boil for 2 hours, the benzene is eliminated by distillation. The residue is treated with 2 N-sodium hydroxide solution and ethyl-acetate and the organic layer is washed with water. After elimination of the solvent by distillation the α-(4-chlorophenyl)-β-(2,4-dichlorophenyl) - acrylic acid-N'-methyl-piperazide is dissolved in acetone and converted into the hydrochloride by adding alcoholic hydrochloric acid. The hydrochloride melts at 188–190° C. (decomposition). The yield amounts to 1 gram.

We claim:

1. The compound of one of the formulas

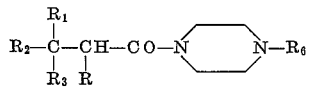

and

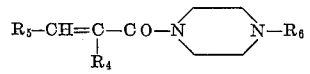

(I)

in which R is hydrogen, halophenyl or halobenzyl, $R_1$ and $R_3$ are hydrogen, lower alkyl, phenyl or halophenyl, $R_2$ is phenyl or halophenyl, $R_4$ and $R_5$ are halophenyl and $R_6$ is hydrogen, lower alkyl hydroxy-lower alkyl, lower alkoxy-lower alkyl, cyclohexyl, lower alkyl-cyclohexyl, phenyl-lower alkyl or halophenyl-lower alkyl, R, $R_1$, $R_2$ and $R_3$ including a total of at least (a) two halophenyl, (b) one halophenyl and one halobenzyl, (c) three phenyl, or (d) two phenyl and one halophenyl and salts of said compounds with physiologically tolerable acids.

2. β,β,β-Tris-(4-chlorophenyl) - propionic - acid-N'-methyl-piperazide, and physiologically tolerable acid addition salts thereof.

3. α,β-Bis-(4-chlorophenyl) - propionic-acid-N'-methyl-piperazide and physiologically tolerable acid addition salts thereof.

4. Bis-(4-chlorobenzyl) - acetic-acid-N'-methyl-piperazide and physiologically tolerable acid addition salts thereof.

5. α,β-Bis-(3,4-dichlorophenyl) - acrylic-acid-N'-methyl-piperazide and physiologically tolerable acid addition salts thereof.

6. β,β,β-Tris-(4-chlorophenyl) - propionic - acid-N'-(β-hydroxy-ethyl)-piperazide and physiologically tolerable acid addition salts thereof.

7. β,β-Bis-(4-chlorophenyl) - β - phenyl-propionic-acid-piperazide and physiologically tolerable acid addition salts thereof.

8. β,β-Bis-(4-fluorophenyl) - β - (4-chlorophenyl)-propionic-acid-N'-methyl-piperazide and physiologically tolerable acid addition salts thereof.

9. β,β-Diphenyl-β-(4-chlorophenyl) - propionic acid-N'-methyl-piperazide and physiologically tolerable acid addition salts thereof.

References Cited

UNITED STATES PATENTS 3,244,701  4/1966  Jurgens et al. _____ 260—240

OTHER REFERENCES

Ide et al.: J. Am. Chem. Soc., vol. 77, pages 3142 to 2143 (1955).

Hromatka et al.: Monatschefte für Chemie, vol. 85, pages 1208 to 1209, 1211 to 1212, 1217 and 1219 (1954).

JOHN D. RANDOLPH, *Primary Examiner.*